United States Patent
El-Rifai et al.

(10) Patent No.: US 8,200,347 B2
(45) Date of Patent: Jun. 12, 2012

(54) METHOD AND APPARATUS FOR HYBRID RESETTING STATES PROPORTIONAL-INTEGRAL-DERIVATIVE AND LAG CONTROLLERS

(75) Inventors: Khalid El-Rifai, Cambridge, MA (US); Osamah El-Rifai, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 559 days.

(21) Appl. No.: 12/357,589

(22) Filed: Jan. 22, 2009

(65) Prior Publication Data

US 2010/0185304 A1    Jul. 22, 2010

(51) Int. Cl.
   *G05B 13/02*  (2006.01)

(52) U.S. Cl. ............... 700/45; 700/28; 700/42

(58) Field of Classification Search ........... 700/72, 700/28, 41–45; 327/552, 556
See application file for complete search history.

(56) References Cited

U.S. PATENT DOCUMENTS

| | | | | |
|---|---|---|---|---|
| 4,441,151 A * | 4/1984 | Hayashibe | ...................... | 700/37 |
| 4,728,481 A * | 3/1988 | Geets | ........................... | 376/216 |
| 4,903,192 A * | 2/1990 | Saito et al. | ..................... | 700/37 |
| 4,908,747 A * | 3/1990 | Lane et al. | ...................... | 700/45 |
| 5,043,863 A * | 8/1991 | Bristol et al. | ................... | 700/45 |
| 5,195,028 A * | 3/1993 | Hiroi | ................................ | 700/41 |
| 5,223,778 A * | 6/1993 | Svarovsky et al. | .............. | 700/42 |
| 5,247,432 A * | 9/1993 | Ueda | ................................ | 700/42 |
| 5,260,865 A * | 11/1993 | Beauford et al. | ............... | 700/31 |
| 5,319,539 A * | 6/1994 | Shinskey | ........................ | 700/37 |
| 5,319,540 A * | 6/1994 | Isaza et al. | ...................... | 700/41 |
| 5,331,541 A * | 7/1994 | Ueda et al. | ...................... | 700/42 |
| 5,335,164 A * | 8/1994 | Gough et al. | ................... | 700/29 |
| 5,335,165 A * | 8/1994 | Shinskey | ........................ | 700/42 |
| 5,404,289 A * | 4/1995 | Hang et al. | ...................... | 700/55 |
| 5,420,785 A * | 5/1995 | Shinskey | ........................ | 700/37 |
| 5,504,672 A * | 4/1996 | Hardiman et al. | .............. | 700/45 |
| 5,544,039 A * | 8/1996 | Hiroi | ................................ | 700/31 |
| 5,566,065 A * | 10/1996 | Hansen et al. | .................. | 700/44 |
| 5,570,282 A * | 10/1996 | Hansen et al. | .................. | 700/41 |
| 5,619,422 A * | 4/1997 | Nakazawa et al. | ............ | 700/299 |
| 5,625,552 A * | 4/1997 | Mathur et al. | .................. | 700/42 |
| 5,687,077 A * | 11/1997 | Gough, Jr. | ...................... | 700/29 |
| 5,691,896 A * | 11/1997 | Zou et al. | ........................ | 700/42 |
| 5,694,077 A | 12/1997 | Fuller | | |
| 5,740,033 A * | 4/1998 | Wassick et al. | ................. | 700/29 |
| 5,742,503 A * | 4/1998 | Yu | ................................... | 700/42 |
| 5,745,362 A * | 4/1998 | Hiroi et al. | ...................... | 700/42 |
| 5,929,700 A | 7/1999 | Fuller | | |

(Continued)

OTHER PUBLICATIONS

Ang, K.H.; Chong, G.C.Y.; and Li, Y., "PID Control System Analysis, Design and Technology", 2005, IEEE Transactions on Control Systems Technology, 13 (4): pp. 559-576.*

(Continued)

*Primary Examiner* — Kakali Chaki
*Assistant Examiner* — Kelvin Booker
(74) *Attorney, Agent, or Firm* — Dirk Brinkman; Gene Vinokur

(57) ABSTRACT

A controller includes a feedforward module to produce a feedforward component $az_r$, where a is a high frequency gain, a proportional module is to produce a proportional component $K_{pv}z$, where $K_{pv}$ is a proportional gain, and an integral or lag module with state resetting to produce an integral or lag component. The feedforward component $az_r$, the proportional component $K_{pv}z$, and the integral component $K_{iv}z_c$ are combined as an input u for the system to be controlled.

15 Claims, 5 Drawing Sheets

U.S. PATENT DOCUMENTS

| | | | | |
|---|---|---|---|---|
| 6,122,605 | A * | 9/2000 | Drees et al. | 702/194 |
| 6,192,283 | B1 * | 2/2001 | Holowko | 700/28 |
| 6,195,596 | B1 * | 2/2001 | Kim | 700/245 |
| 6,343,235 | B1 * | 1/2002 | Hausen et al. | 700/42 |
| 6,680,607 | B2 * | 1/2004 | Smith | 324/76.79 |
| 7,113,834 | B2 * | 9/2006 | Wojsznis et al. | 700/42 |
| 7,113,835 | B2 * | 9/2006 | Boyden et al. | 700/44 |
| 7,117,046 | B2 * | 10/2006 | Boyden et al. | 700/44 |
| 7,155,319 | B2 * | 12/2006 | Nangoy et al. | 700/281 |
| 7,522,963 | B2 * | 4/2009 | Boyden et al. | 700/52 |
| 7,536,232 | B2 * | 5/2009 | Boyden et al. | 700/52 |
| 7,640,067 | B2 * | 12/2009 | Boyden et al. | 700/52 |
| 7,698,004 | B2 * | 4/2010 | Boyden et al. | 700/52 |
| 7,706,899 | B2 * | 4/2010 | El Rifai | 700/42 |
| 7,805,207 | B2 * | 9/2010 | El Rifai | 700/42 |
| 7,860,586 | B2 * | 12/2010 | Boyden et al. | 700/52 |
| 7,862,771 | B2 * | 1/2011 | Boyden et al. | 422/62 |
| 7,920,930 | B2 * | 4/2011 | Francis | 700/45 |
| 7,930,045 | B2 * | 4/2011 | Cheng | 700/45 |
| 8,055,358 | B2 * | 11/2011 | Blevins et al. | 700/45 |
| 8,095,227 | B2 * | 1/2012 | Ydstie | 700/45 |
| 2002/0147510 | A1 * | 10/2002 | Francis | 700/45 |
| 2003/0097193 | A1 * | 5/2003 | Makino et al. | 700/42 |
| 2003/0214281 | A1 * | 11/2003 | Smith | 324/76.79 |
| 2004/0167659 | A1 * | 8/2004 | Scherer | 700/173 |
| 2005/0222695 | A1 * | 10/2005 | Yoneda | 700/63 |
| 2006/0042461 | A1 * | 3/2006 | Boyden et al. | 95/1 |
| 2006/0045800 | A1 * | 3/2006 | Boyden et al. | 422/62 |
| 2006/0045801 | A1 * | 3/2006 | Boyden et al. | 422/62 |
| 2006/0045802 | A1 * | 3/2006 | Boyden et al. | 422/62 |
| 2006/0045803 | A1 * | 3/2006 | Boyden et al. | 422/62 |
| 2006/0045804 | A1 * | 3/2006 | Boyden et al. | 422/62 |
| 2006/0047347 | A1 * | 3/2006 | Boyden et al. | 700/20 |
| 2006/0047366 | A1 * | 3/2006 | Boyden et al. | 700/266 |
| 2006/0047526 | A1 * | 3/2006 | Boyden et al. | 705/1 |
| 2006/0058899 | A1 * | 3/2006 | Boyden et al. | 700/44 |
| 2006/0083530 | A1 * | 4/2006 | Bartley et al. | 399/70 |
| 2006/0167570 | A1 * | 7/2006 | Francis | 700/34 |
| 2007/0021850 | A1 * | 1/2007 | Wojsznis et al. | 700/42 |
| 2007/0168057 | A1 * | 7/2007 | Blevins et al. | 700/31 |
| 2008/0195236 | A1 * | 8/2008 | Koo et al. | 700/42 |
| 2009/0082883 | A1 * | 3/2009 | Francis | 700/33 |
| 2009/0187268 | A1 * | 7/2009 | Sugishita et al. | 700/42 |
| 2009/0192634 | A1 * | 7/2009 | Fujinaka | 700/42 |
| 2009/0198350 | A1 * | 8/2009 | Thiele | 700/30 |
| 2009/0248176 | A1 * | 10/2009 | El Rifai | 700/45 |
| 2009/0248177 | A1 * | 10/2009 | El Rifai | 700/45 |
| 2009/0299500 | A1 * | 12/2009 | Rubin et al. | 700/42 |
| 2009/0319060 | A1 * | 12/2009 | Wojsznis et al. | 700/42 |
| 2010/0087933 | A1 * | 4/2010 | Cheng | 700/30 |
| 2010/0152868 | A1 * | 6/2010 | Chen et al. | 700/42 |

OTHER PUBLICATIONS

Chen, Q.; Chait, Y.; and Hollot, C.V., "Analysis of Reset Control Systems Consisting of a FORE and Second Order Loop", Jun. 2001, Journal of Dynamic Systems, Measurement and Control, vol. 123.*

El Rifai, K. and El Rifai, O., "Design of Hybrid Resetting PID and Lag Controllers with Application to Motion Control", Nov. 2009, Mitsubishi Electric Research Laboratories, obtained online at www.merl.com.*

Erenoglu, I.; Eksin, I.; Yesil, E.; and Guzelkaya, M., "An Intelligent Hybrid Fuzzy PID Controller", 2006, Proceedings 20$^{th}$ European Conference on Modelling and Simulation, ISBN 0-9553018-0-7.*

Cervin, Anton; Eker, Johan, Bernhardsson, Bo and Arzen, Karl-Erik, "Feedback-Feedforward Scheduling of Control Tasks", 2002, Real-Time Systems (Special Issue on Control-Theoretical Approaches to Real-Time Computing).*

Wu, Daowei; Guo, Guoxiao and Wang, Youyi, "Reset Integral-Derivative Control for HDD Servo Systems", Jan. 2007, IEEE Transactions on Control Systems Technology, vol. 15, No. 1.*

Banos, A., and A. Vidal. Design of PI+CI Reset Compensators for second order plants.IEEE International Symposium on Industrial Electronics , Vigo, Spain, 2007.

* cited by examiner

METHOD AND APPARATUS FOR HYBRID RESETTING STATES PROPORTIONAL-INTEGRAL-DERIVATIVE AND LAG CONTROLLERS

FIELD OF THE INVENTION

This invention relates generally controlling systems, and in particular to resetting states of proportional-integral-derivative (PID) and lag controllers.

BACKGROUND OF THE INVENTION

Traditional controllers were designed for systems that output either discrete or continuous signals. More recent hybrid controllers provide integrated control for discrete and continuous signals. Hybrid controlled systems can enable higher performance, versatility, and autonomy. A specific problem in hybrid controllers is resetting the integrator and first order reset elements (FORE).

The state of a linear controller is reset to zero, or same other known value, whenever some threshold is reached. The Clegg integrator and the FORE are now being revisited within the framework of hybrid controllers to overcome fundamental limitations associated with linear feedback, such as overshoot and settling time bounds.

The following U.S. patents describe dynamic state resetting. U.S. Pat. No. 5,929,700 describe a method for a nonlinear notch filter employing a type of filter state resetting with reduced phase lag compared to a linear notch, which is used as part of a controlled system to improve the bandwidth of systems with resonant modes. U.S. Pat. No. 5,694,077 describes a method for resetting different types of filters such as low pass, high pass, and bandpass filters to reduce their phase lag.

SUMMARY OF THE INVENTION

The embodiments of the invention provide a method and system for resetting a state of hybrid controller using generalized integral and first order resetting control techniques for use with a proportional-integral-derivative (PID) and lag controller for first and second order dominant controlled system. This reduces to a Clegg integrator for integral control of a first order controlled system. In addition, different modifications to alleviate design trade-offs are introduced.

DETAILED DESCRIPTION OF THE PREFERRED EMBODIMENTS

A dynamic hybrid resetting (impulsive) system can be modeled as $$\dot{x} = f_c(x) \text{ if } (t,x) \notin S_r$$

$$x^+ = f_d(x), \text{ if } (t,x) \in S_r \quad (1)$$

where x generally indicates states of the system and controller. The states are reset selectively as described below. That is, some but not necessarily all states are reset. The dots above the variables () and (), here and below, are the conventional way for indicating an order of the derivative as known in the art, (+) indicates a next state, an input to the system is u, time is t, the Lipschitz continuous function $f_c$ describes the continuous-time dynamics of the controller, and the function $f_d$ is the resetting law with $S_r$ being a resetting set that defines the resetting condition based on time and/or state.

It is assumed that the resetting times $t_k$ are well-defined and distinct, i.e., and $t_k - t_{k-1} \geq \epsilon$ for $\epsilon > 0$. Thus, the controller state is non-zero with well-defined solutions. This can be achieved by imposing a sampling on the resetting condition, as would be the case in a practical implementation, or by additional time-based condition.

We consider a class of systems s that includes a chain of integrators $$ay^{(n)} = u, \quad (2)$$

where $y^n$ is the $n^{th}$ derivative of a targeted output y, and $n \leq 2$ is a selected dominant order of the system. The constant parameter a is a high frequency gain. It is assumed that output signals y, $y^{(n-1)}$ are available, which is typical for a PID controller. Furthermore, a reference trajectory r and its first n derivatives $r^{(1)}, \ldots, r^{(n)}$ are known, bounded and, piecewise continuous.

An error variable is constructed as $$z = -(d/dt + K_{pp})^{n-1} e,$$

where $K_{pp} > 0$ is a selected scalar, and $e = r - y$ is a tracking error for a desired reference trajectory r.

We consider the following control law (input) for the controlled system $$u = K_{pv} z - K_{iv} z_c + a \dot{z}_r, \quad (3)$$

where states $$\dot{z}_c = z, \text{ if } zz_c \geq 0$$

$$z_c^+ 0, \text{ if } zz_c \leq 0, \text{ and}$$

where $K_{pv} > 0$ is a proportional gain, and $K_{iv} > 0$ is an integral gain.

In the controller, the "feedforward" signal is $$\dot{z}_r = y^{(n)} - \dot{z},$$

where $y^{(n)}$ is the $n^{th}$ derivative of the targeted output y.

For order n=1, we have $$\dot{z}_r = \dot{r},$$

and for n=2, we have $$\dot{z}_r = \ddot{r} + K_{pp} \dot{e}.$$

Figure 1:
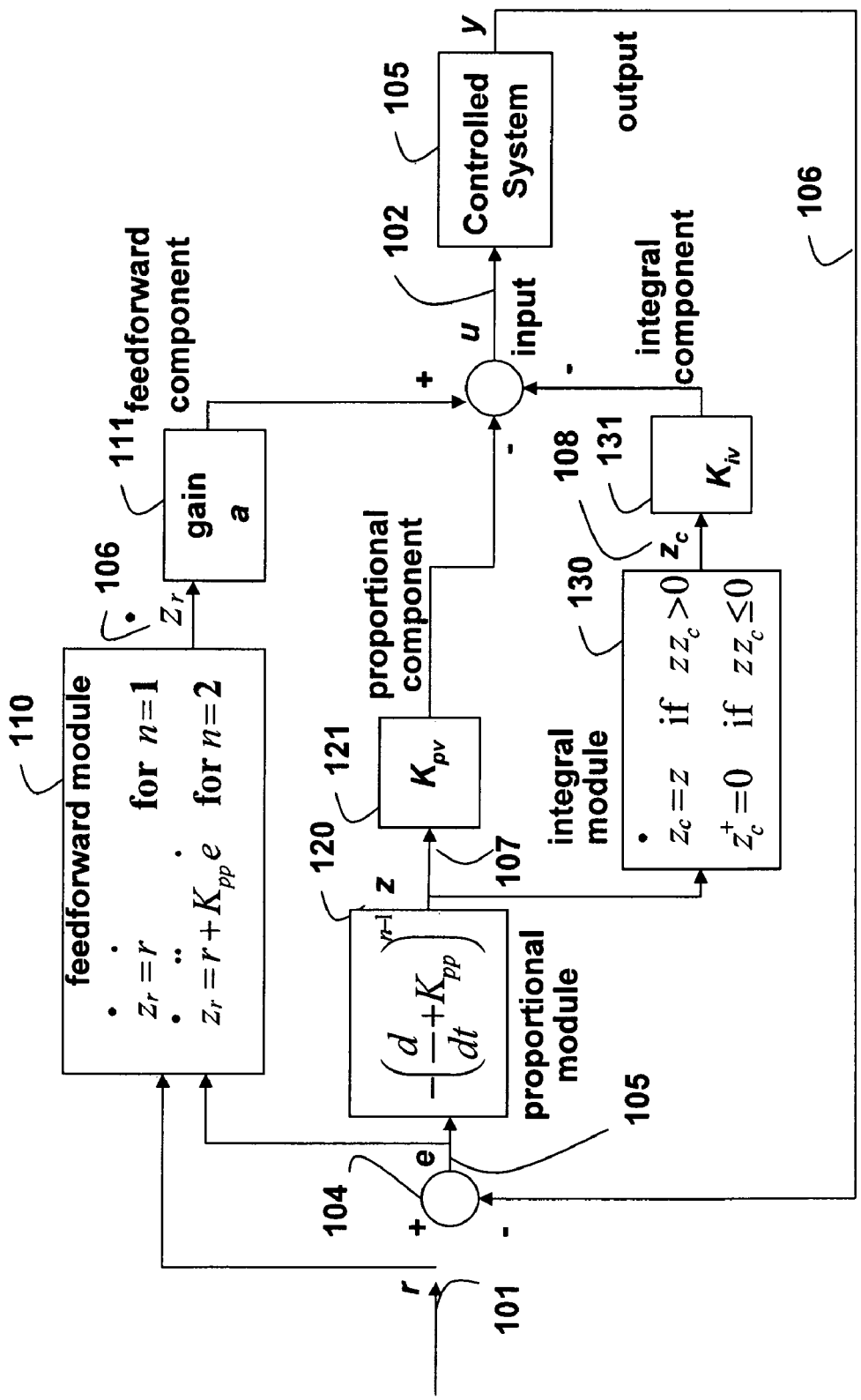
FIG. 1 is a block diagram of a hybrid resetting controller according to an embodiment of the invention.

FIG. 1 shows the controller according to the above models. The reference signal is r 101, the input to the system 105 is u 102, and the output of the system is y 106.

A feedforward module 110 produces a feedforward signal $\dot{z}_r$ 106 to which a gain a 111 is applied to produce a feedforward component for the input u 102. FIG. 1 shows the feedforward signal for order n=1 and n=2.

A proportional module 120 produces a proportional signal z 107 with gain $K_{pv}$ 121 based on the error variable e 105 and the reference signal r, which forms the proportional component for the input u.

An integral or lag module 130 produces an integral or lag signal 108 with an integral gain $K_{iv}$ 131 to produce an integral component for the input u.

The feedforward module, the proportional module and the integral or lag module form a controller for the system 105. At any one time, the controller has a state, and according to the embodiments of the invention, the integral or lag module is configured to resetting this state. That is, in contrast with the prior art, the module 130 is capable of resetting the controller as described in further detail below. In the embodiments described herein, the state is represented by signal $z_c$, or $z_{ci}$ in some embodiments with multiple states. Generally, a reset occurs when $z_c$ or $z_{ci}=0$.

The output y 106 of the system 105 is subtracted from the reference signal r to produce the tracking error e for the proportional module 120.

Substituting Equation (3) into Equation (2) yields the following hybrid resetting closed loop ($\dot{x}_{cl}$) controller and system $$\dot{x}_{cl} = A_c x_{cl}, \quad \text{if } zz_c \geq 0 \quad (4)$$
$$x_{cl}^+ = A_d x_{cl}, \quad \text{if } zz_c \leq 0,$$

where $$x_{cl} = [z, z_c]^T, \text{ and}$$

$$A_c = \begin{bmatrix} -K_{pv}/a & -K_{iv}/a \\ 1 & 0 \end{bmatrix}$$

$$A_d = \begin{bmatrix} 1 & 0 \\ 0 & 0 \end{bmatrix}.$$

We consider the following Lyapunov function $$V = az^2 + K_{iv} z_c^2.$$

Computing $\dot{V}$ for the continuous-time part yields $$\dot{V} = -2K_{pv} z^2 \leq 0,$$

whereas, for the resetting dynamics of Equation (4) can be expressed as $$\Delta V = V(x_{cl}^+) - V(x_{cl}) = -K_{iv} z_c^2 \leq 0.$$

Using standard stability results for impulsive (resetting) hybrid controller, this proves the Lyapunov stability of the closed loop controller and system.

By hybrid extensions of the invariant set theorem, the state of the controller converges asymptotically to the fixed-point ($z=0$, $z_1=0$), and thus the tracking error e approached zero asymptotically.

Combining a Resetting and a Non-Resetting Integrators

We consider the following control law $$u = -K_{pv} z - K_{iv1} z_{c1} - K_{iv2} z_{c2} + a\dot{z}_r, \quad (4)$$

where states $$\dot{z}_{c1} = z, \text{ if } zz_{c1} \geq 0$$

$$z_{c1}^+ = 0, \text{ if } zz_{c1} \leq 0$$

$$\dot{z}_{c2} = z$$

where $K_{iv1} > 0$ is the resetting integrator gain corresponding to state $z_{l1}$, and $K_{iv2} > 0$ is the non-resetting integral gain corresponding to state $z_{l2}$.

Thus, we obtain the following hybrid resetting controller $$u = -K_{pv} z - K_{iv} z_c + a\dot{z}_r$$

$$\dot{z}_c = z, \text{ if } zz_c \geq 0$$

$$z_c^+ = b_d, \text{ if } zz_c \leq 0. \quad (5)$$

The stability of this controller can be analyzed with the following Lyapunov function $$V = az^2 + K_{iv}(z_c - d/K_{iv})^2.$$

Computing $\dot{V}$ for the continuous-time part yields $$\dot{V} = -2K_{pv} z^2 \leq 0.$$

Whereas, for the resetting dynamics we have:

$$\Delta V = V(x_{c1}^+) - V(x_{c1}) = -K_{iv} z_c^2 \leq 0.$$

This proves Lyapunov stability of the closed loop controller of Equation (5) with the combined integrators method.

Furthermore, by hybrid extensions of the invariant set theorem, the controller converges asymptotically to the fixed-point $$(z, z_{l1}, z_{l2}) = \left(0, 0, \frac{d}{K_{iv2}}\right),$$

and thus the tracking error approaches zero asymptotically. Therefore, zero steady-state rejection of constant disturbances is possible.

Hybrid Resetting Lag Compensators

Here, the resetting PI compensator, which is used for order n=1 and within a PID controller for n=2, is modified to yield resetting lag compensators. A resetting lag controller can be achieved by replacing the resetting integrator of the FORE, such that $$u = -K_{pv} z - K_{iv} z_c + a\dot{z}_r, \text{ and} \quad (6)$$

the states of the controller are $$\dot{z}_c = z - a_c z_c, \text{ if } (z - a_c z_c) z_c \geq 0$$

$$z_c^+ = 0, \text{ if } (z - a_c z_c) z_c \leq 0$$

and where the controller time lag or pole is $a_c \leq 0$.

Figure 2:
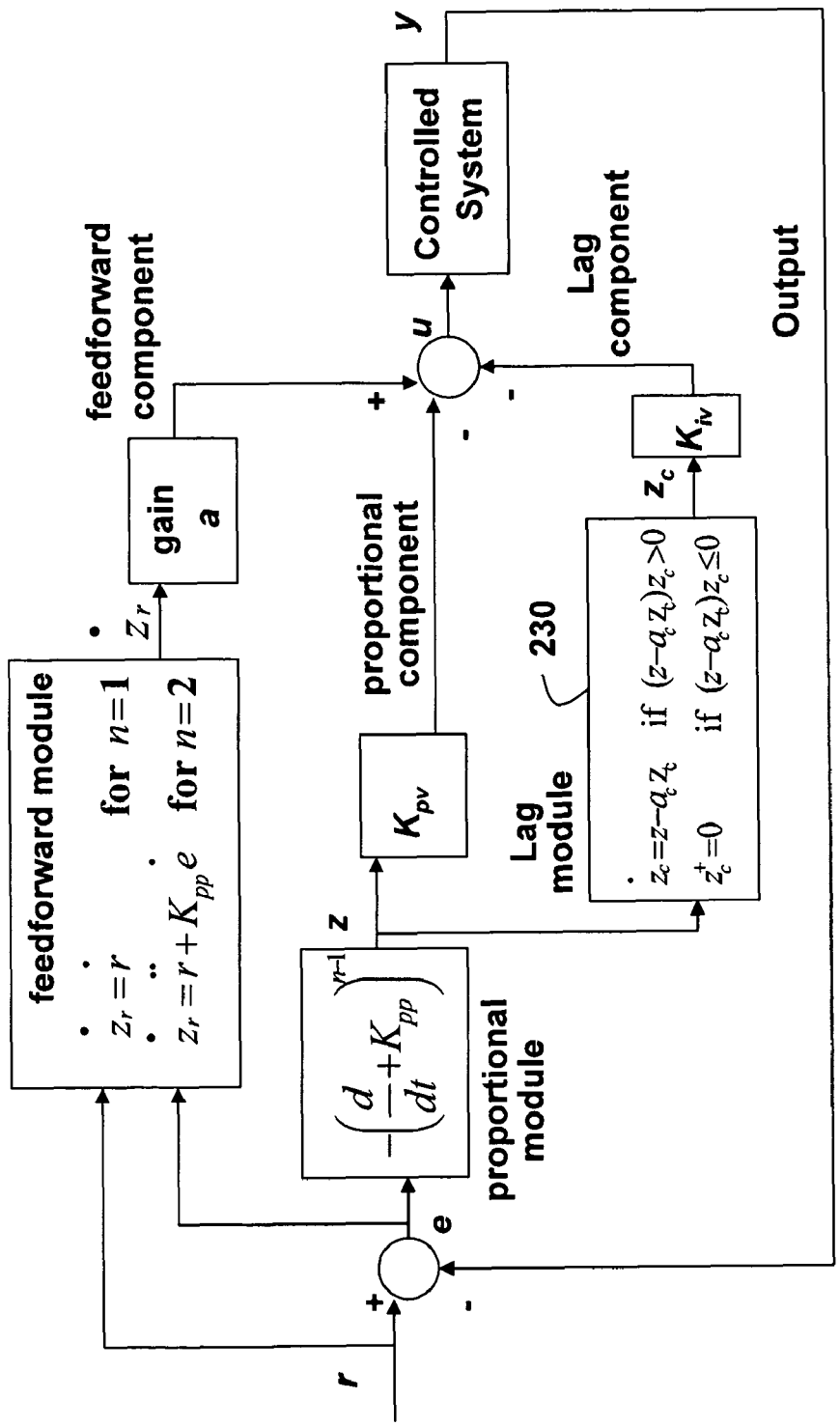
FIG. 2 is a block diagram of a lag hybrid resetting controller according to an embodiment of the invention.

This controller is shown in FIG. 2, where the integral module 230 determines the integral gain component. All other components are as for FIG. 1.

Stability of the controller can be shown using the following Lyapunov function $$V = az^2 + K_{iv1} z_c^2,$$

Computing $\dot{V}$ for the continuous-time part yields:

$$\dot{V} = -K_{pv} z^2 - K_{iv} a_c z_c^2 < 0$$

Whereas, for the resetting dynamics $$\Delta V = V(x_{c1}^+) - V(x_{c1}) = -K_{iv} z_c^2 \leq 0.$$

This proves exponential stability, and input-to-state stability, of the closed loop hybrid controller because $\dot{V} < 0$.

Higher Order Resetting Controller

Consider the following control law $$u = -K_{pv} z - \sum_i^N K_i z_{ci} + a\dot{z}_r \quad (7)$$

where states $$\dot{z}_{ci} = z - a_{ci} z_{ci}, \text{ if } (z - a_{ci} z_{ci}) zz_{ci} \geq 0, \text{ and}$$

$$z_{ci}^+ = a_{di} z_{ci} + b_{di}, \text{ if } (z - a_{ci} a_{ci}) zz_{ci} \leq 0,$$

where the scalars $a_{ci} \leq 0$ and $|a_{di}| \leq 1$ for N controller states, and where $a_{ci} = 0$ corresponds to an integrator, and $a_{ci} > 0$ corresponds to the FORE if $a_{di} = 1$, and a selected offset $b_{dj} = 0$ for the $j^{th}$ controller state. This way the controller can operate as a non-resetting integrator controller or a lag controller.

Figure 3:
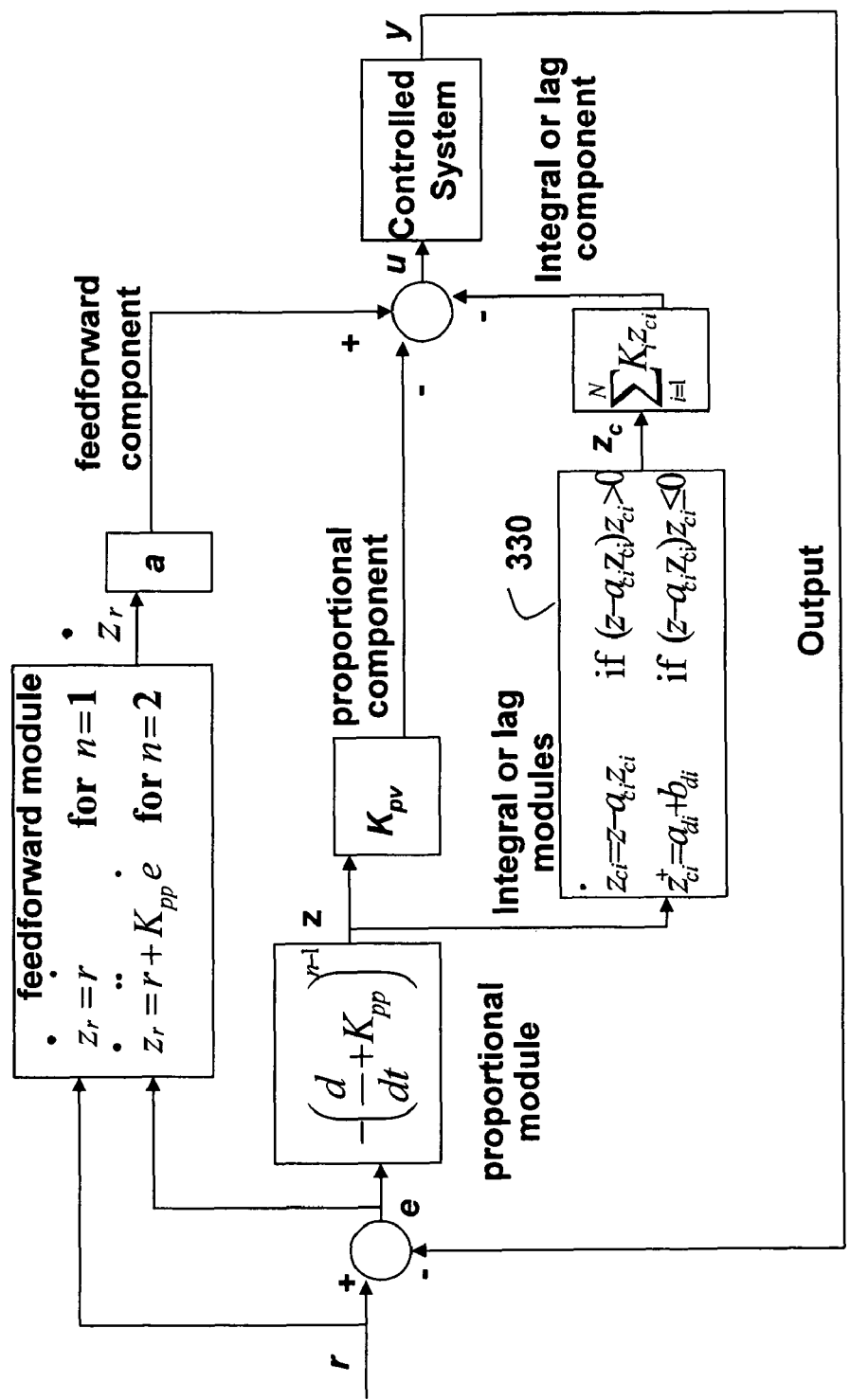
FIG. 3 is a block diagram of a high order hybrid resetting controller according to an embodiment of the invention.

This controller is shown in FIG. 3, where the integral module 330 determines the integral gain component. All other components are as for FIG. 1.

Let $b_{dj}=0$, and consider the following Lyapunov function:

$$V = az^2 + \sum_i^N k_i z_{ci}^2.$$

Computing $\dot{V}$ for the continuous-time part with the controller according to Equation (7) yields $$\dot{V} = -K_{pv}z^2 - \sum_i^N K_i a_{ci} z_{ci}^2 \le 0,$$

whereas for the resetting dynamics $$\Delta V = V(x_{cl}^+) - V(x_{cl}) = \sum_i^N K_i(a_{di}^2 - 1)z_{ci}^2 \le 0.$$

This proves the Lyapunov stability of the system with the controller given by Equation (7). Whereas, when $a_{ci}>0$ for all $i$, then $\dot{V}<0$ and exponential stability of the hybrid controller is shown.

Analysis

Figure 4:
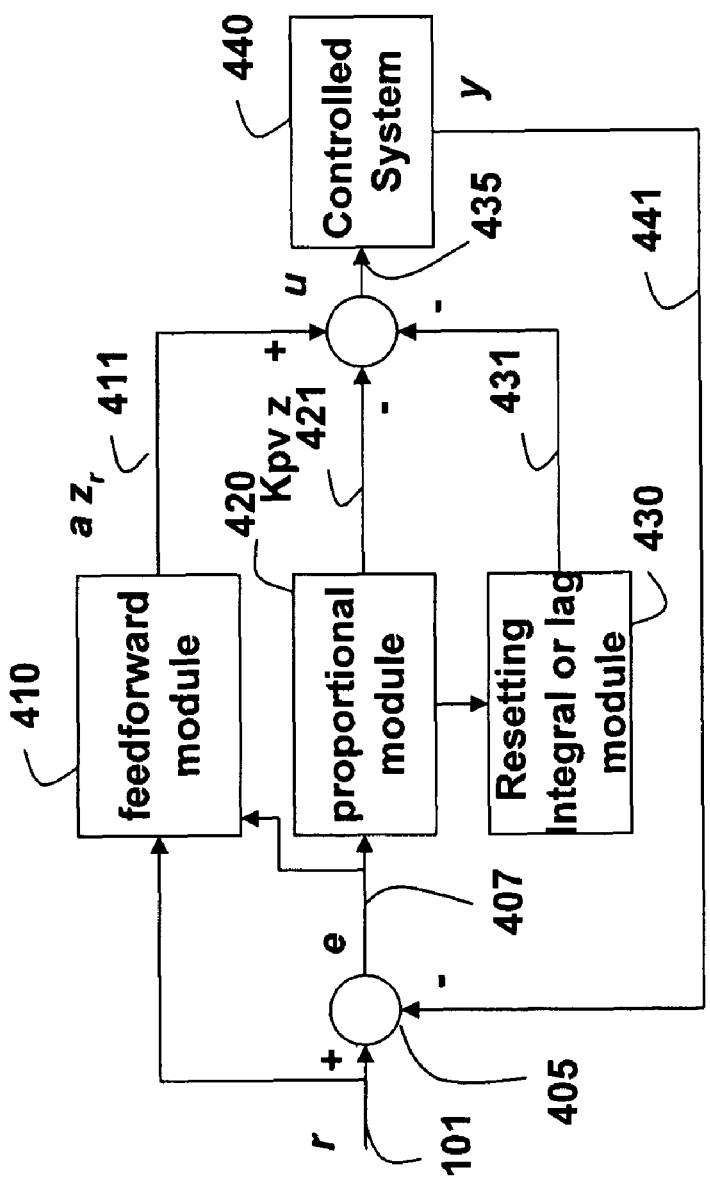
FIG. 4 is a block diagram of a resetting controller according to the embodiments of the invention.

FIG. 4 shows our controller in its simplest form. The controller includes a feedforward module 410 to produce a feedforward component $z_r$ 411 of an input u 435 for a system 440 to be controlled. A proportional module is to produce a proportional component z of the input. An integral module is configured to produce an integral component $z_c$ based on the proportional component. The components $z_r$, z, and $z_c$ are combined 435 to produce the input u for the system 440.

The output y of the system is subtracted 405 from a reference signal r to produce an error signal e 407 for the feedforward module and the proportional module. The reference signal r is also provided to the feedforward module.

Figure 5:
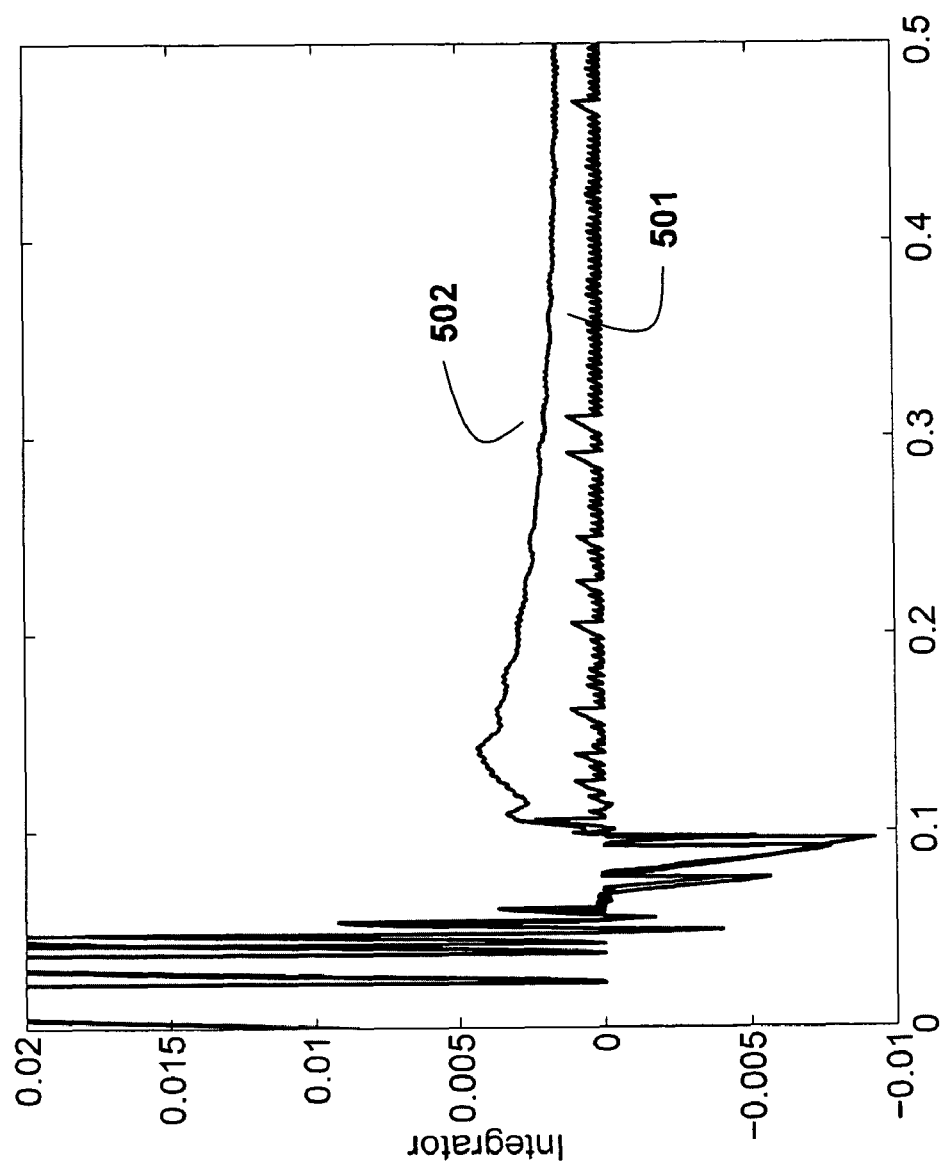
FIG. 5 is a graph comparing states of an integrator in a controller with and without resetting.

FIG. 5 compares the behavior of a PID controller with (501) and without (502) resetting. Note the resetting spikes in curve 501. In FIG. 5, the vertical access is integrator state, and the horizontal axis is time. If the integral module is continuously reset to zero, the controller does not achieve optimal steady-state tracking if there is a constant disturbance. Whereas, when the resetting is switched off after 0.1 seconds, then the integral module follows the value or response needed to overcome the disturbance yet retains the transient benefits of resetting.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component $K_{pv}z$, and the integral or lag components to produce an input u for the system to be controlled, wherein the feedforward module is provided with a reference signal r and an error signal e, and wherein where the error signal is a difference between the reference signal and an output y of the system, and the error signal is also provided to the proportional module.

2. The controller of claim 1, wherein the feedforward component
is $\dot{z}_r=\dot{r}$,
for order n=1, and $\dot{z}_r=\ddot{r}+K_{pp}\dot{e}$, for order n=2, and wherein $K_{pp}$ is a gain, $z=-(d/dt+K_{pp})^{n-1}e$.

3. The controller of claim 1, wherein the input is $u=-K_{pv}z-K_{iv}z_c+a\dot{z}_r$, where a is a high frequency gain, $K_{iv}$ is an integral gain, and the integral component is $\dot{z}_c=z$, if $zz_c \ge 0$ $z_c^+=0$, if $zz_c<0$, such that the controller operates as a hybrid resetting controller.

4. The controller of claim 1, wherein the input is $u=-K_{pv}z-K_{iv}z_c+a\dot{z}_r$, where a is a high frequency gain, $K_{iv}$ is an integral gain, and wherein the lag component is $\dot{z}_c=z-a_c z_c$, if $(z-a_c z_c)z_c>0$ $z_c^+=0$, if $(z-a_c z_c)z_c \le 0$, and where $a_c$ is the lag pole, such that the controller operates as a resetting lag controller.

5. The controller of claim 1, wherein the input is $$u = -K_{pv}z - \sum_i^N K_i z_{ci} + az_r,$$

where the integral or lag components are $\dot{z}_{ci}=z-a_{ci}z_{ci}$, if $(z-a_{ci}z_{ci})z_{ci}>0$ $z_{ci}^+=a_{di}z_{ci}+b_{di}$, if $(z-a_{ci}z_{ci})z_{ci} \le 0$, where $a_{ci} \le 0$ and $|a_{di}| \le 1$ for N controller states, and wherein $a_{ci}=0$ corresponds to an integrator and $a_{ci}>0$ corresponds to a lag element, and a selected offset is $b_{dj}$ for a $j^{th}$ state of the controller.

6. The controller of claim 1, wherein the input is $u=-K_{pv}z-K_{iv1}z_{c1}-K_{iv2}z_{c2}+a\dot{z}_r$, where a is a high frequency gain, and $\dot{z}_{c1}=z$, if $zz_{c1} \ge 0$ $z_{c1}^+ = 0$, if $zz_{c1} \leq 0$ $\dot{z}_{c2} = z$ where $K_{iv1} > 0$ is the integral gain corresponding to state $z_{l1}$, and $K_{iv2} > 0$ is a non-resetting integral gain corresponding to state $z_{l2}$.

7. The controller of claim 1, wherein the input is $u = -K_{pv}z - K_{iv}z_c + a\dot{z}_r$, where a is a high frequency gain, $K_{iv}$ is an integral gain, and $\dot{z}_c = z$, if $zz_c \geq 0$ $z_c^+ = a_d(t)z_c$, if $zz_c \leq 0$ where $a_d$ is a resetting tune varying gain that can allow for switching the resetting off based on a time or state threshold condition, and t is time.

8. The controller of claim 1, wherein the input is $u = -K_{pv}z - K_{iv}z_c + a\dot{z}_r$, where, and a is a high frequency gain, and $K_{iv}$ is an integral gain.

9. The controller of claim 1, wherein the input is $u = -K_{pv}z - K_{iv}z_c + a\dot{z}_r$, where a is a high frequency gain, $K_{iv}$ is an integral gain, and the integral component is $\dot{z}_c = z$, if $zz_c \geq 0$ $z_c^+ = b_d$, if $zz_c \leq 0$, where $b_d$ is a selected offset, and controller operates as a hybrid resetting controller.

10. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component and the integral or lag components to produce an input u for the system to be controlled, wherein the input is $u = -K_{pv}z - K_{iv}z_c + a\dot{z}_r$, where a is a high frequency gain, $K_{iv}$ is an integral gain, and the integral component is $\dot{z}_c = z$, if $zz_c \geq 0$ $z_c^+ = 0$, if $zz_c \leq 0$, such that the controller operates as a hybrid resetting controller.

11. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component $K_{pv}z$, and the integral or lag components to produce an input u for the system to be controlled, wherein the input is $u = -K_{pv}z - K_{iv}z_c + a\dot{z}_r$, where a is a high frequency gain, $K_{iv}$ is an integral gain, and wherein the lag component is $\dot{z}_c = z - a_c z_c$, if $(z - a_c z_c)z_c \geq 0$ $z_c^+ = 0$, if $(z - a_c z_c)z_c \leq 0$, and where $a_c$ is the lag pole, such that the controller operates as a resetting lag controller.

12. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component. $K_{pv}z$, and the integral or lag components to produce an input u for the system to be controlled, wherein the input is $$u = -K_{pv}z - \sum_i^N K_i z_{ci} + a\dot{z}_r,$$

where the integral or lag components are $\dot{z}_{ci} = z - a_{ci}z_{ci}$, if $(z - a_{ci}z_{ci})z_{ci} \geq 0$ $z_{ci}^+ = a_{di}z_{ci} + b_{di}$, if $(z - a_{ci}z_{ci})z_{ci} \leq 0$, and where $a_{ci} \leq 0$ and $|a_{di}| \leq 1$ for N controller states, and wherein $a_{ci} = 0$ corresponds to an integrator and $a_{ci} > 0$ corresponds to a lag element, and a selected offset is $b_{dj}$ for a $j^{th}$ state of the controller.

13. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component $K_{pv}z$, and the integral or lag components to produce an input u for the system to be controlled, wherein the input is $u = -K_{pv}z - K_{iv}z_c + a\dot{z}_r$, where a is a high frequency gain, and $\dot{z}_{c1} = z$, if $zz_{c1} \geq 0$ $z_{c1}^+ = 0$, if $zz_{c1} \leq 0$, $\dot{z}_{c2} = z$ where $K_{iv1}>0$ is the integral gain corresponding to state $z_{l1}$, and $K_{iv2}>0$ is a non-resetting integral gain corresponding to state $z_{l2}$.

14. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component $K_{pv}z$, and the integral or lag components to produce an input u for the system to be controlled, wherein the input is $$u=-K_{pv}z-K_{iv}z_c+a\dot{z}_r,$$

where a is a high frequency gain, $K_{iv}$ is an integral gain, and $$\dot{z}_c=z, \text{ if } zz_c\geq 0$$

$$z_c^+=a_d(t)z_c, \text{ if } zz_c\leq 0,$$

where $a_d$ is a resetting time varying gain that can allow for switching the resetting off based on a time or state threshold condition, and t is time.

15. A controller for controlling a system, comprising:
a feedforward module to produce a feedforward component $az_r$, where a is a high frequency gain;
a proportional module to produce a proportional component $K_{pv}z$, where $K_{pv}$ is a proportional gain;
an integral or lag module to produce respective integral or lag components, wherein the feedforward module and the proportional module and the integral or lag module form a controller having a state, and the integral or lag module is capable of resetting the state; and
means for combining the feedforward component $az_r$, the proportional component $K_{pv}z$, and the integral or lag components to produce an input u for the system to be controlled, wherein the input is $$u=-K_{pv}z-K_{iv}z_c+a\dot{z}_r,$$

where a is a high frequency gain, $K_{iv}$ is an integral gain, and the integral component is $$\dot{z}_c=z, \text{ if } zz_c\geq 0$$

$$z_c^+=b_d, \text{ if } zz_c\leq 0,$$

where $b_d$ is a selected offset, and controller operates as a hybrid resetting controller.

* * * * *